United States Patent [19]
Shimizu et al.

[11] Patent Number: 5,993,951
[45] Date of Patent: Nov. 30, 1999

[54] TRANSPARENT PLASTIC SHEET

[75] Inventors: Minoru Shimizu; Yoshifumi Kubota, both of Otake; Jun Nakauchi, Tokyo, all of Japan

[73] Assignee: Mitsubishi Rayon Co., Ltd., Tokyo, Japan

[21] Appl. No.: 09/035,306

[22] Filed: Mar. 2, 1998

[51] Int. Cl.$^6$ ........................................................ B32B 9/00
[52] U.S. Cl. ........................... 428/220; 428/412; 526/273; 526/318.4; 525/71; 525/208; 525/301
[58] Field of Search ................................. 526/273, 318.4; 525/71, 208, 301; 428/220, 412; 353/120

[56] References Cited

U.S. PATENT DOCUMENTS 4,371,585 2/1983 Memon ..................................... 428/412

*Primary Examiner*—William Krynski
*Assistant Examiner*—Hong J. Xu
*Attorney, Agent, or Firm*—Oblon, Spivak, McClelland, Maier & Neustadt, P.C.

[57] ABSTRACT

Disclosed is a transparent plastic sheet obtained by co-polymerizing 100 parts by weight of methyl methacrylate with 0.1 to 2.0 parts by weight of methacrylic acid and 0.1 to 1.5 parts by weight of glycidyl methacrylate, and having a thickness of not greater than 4 inches, wherein the angular deviation satisfies specified conditions according to the thickness of the sheet and wherein the degree of swelling is not greater than 2.50. This transparent plastic sheet shows neither coloring nor sink marks on the surface, has excellent craze resistance and low long-term water absorption percentage, and is hence suitable for use as an aircraft windshield.

5 Claims, No Drawings

TRANSPARENT PLASTIC SHEET

BACKGROUND OF THE INVENTION

1. Field of the Invention

This invention relates to transparent plastic sheets and, more particularly, to transparent plastic sheets for use as aircraft windshields.

2. Description of the Prior Art

Methacrylic resins are being used in a wide variety of industrial fields owing to their characteristic features including excellent optical properties, good weather resistance, and feeling of high quality. At present, the range of their use shows a tendency to increase still more. In particular, their use as aircraft windshields has been an important field of application since prewar days.

Although MIL standards have been established as standards for aircraft windshields and drawn sheets for use as aircraft windshields, their performance requirements are becoming gradually severer with the development of aircraft.

Consequently, MIL-P-8184E including an alteration of the standard for craze resistance and the establishment of a standard for long-term water absorption percentage has been set up.

Craze resistance is one of the very important properties of aircraft windshields. In order to improve this property, it has been common practice to crosslink the resin material. However, an increased degree of crosslinking may make it difficult to form the resin material into windshields. Moreover, in order to improve craze resistance at a low degree of crosslinking, there has been proposed a method in which methyl methacrylate is copolymerized with neopentylene glycol dimethacrylate (Japanese Patent Laid-Open No. 192414/'87).

Although this method is effective in improving craze resistance, wavy sink marks are produced on the surface of the resulting sheet. In order to use this sheet as a windshield, its surface must be smoothed by grinding or the like.

Alternatively, the copolymerization of methyl methacrylate with methacrylamide, which is practically used to make aircraft windshields, can also produce an improvement in craze resistance. However, the resulting sheet has the problem of being tinged with yellow.

Thus, the prior art relating to aircraft windshields can bring about an improvement in craze resistance. However, the resulting sheets present such problems as coloring, sink marks on the surface, and an increase in long-term water absorption percentage, and cannot be regarded as satisfactory.

SUMMARY OF THE INVENTION

An object of the present invention is to provide transparent plastic sheets which show neither coloring nor sink marks on the surface, have excellent craze resistance and low long-term water absorption percentage, and are hence suitable for use as aircraft windshields.

The subject matter of the present invention comprises a transparent plastic sheet obtained by copolymerizing 100 parts by weight of methyl methacrylate with 0.5 to 2.0 parts by weight of methacrylic acid and 0.5 to 1.5 parts by weight of glycidyl methacrylate, and having a thickness of not greater than 4 inches, wherein the angular deviation satisfies any of the following conditions 1 to 7 according to the thickness of the sheet and wherein the degree of swelling is not greater than 2.20.

The subject matter of the present invention also comprises a transparent plastic sheet obtained by copolymerizing 100 parts by weight of methyl methacrylate with 0.1 to 0.5 part by weight of methacrylic acid and 0.1 to 0.5 part by weight of glycidyl methacrylate, and having a thickness of not greater than 4 inches, wherein the angular deviation satisfies any of the following conditions 1 to 7 according to the thickness of the sheet and wherein the degree of swelling is in the range of 2.20 to 2.50.

Condition 1: When the thickness of said sheet ranges from 0.06 inch to less than 0.22 inch, the value obtained by measuring the angular deviation at a position 1 inch or more inside of an end of said sheet is within 7 minutes.

Condition 2: When the thickness of said sheet ranges from 0.22 inch to less than 0.25 inch, the value obtained by measuring the angular deviation at a position 3 inches or more inside of an end of said sheet is within 7 minutes, and the value obtained by measuring the angular deviation at a position 1 inch to less than 3 inches inside of an end of said sheet is within 9 minutes.

Condition 3: When the thickness of said sheet ranges from 0.25 inch to less than 0.375 inch, the value obtained by measuring the angular deviation at a position 3 inches or more inside of an end of said sheet is within 7 minutes, and the value obtained by measuring the angular deviation at a position 1 inch to less than 3 inches inside of an end of said sheet is within 12 minutes.

Condition 4: When the thickness of said sheet ranges from 0.375 inch to less than 0.500 inch, the value obtained by measuring the angular deviation at a position 3 inches or more inside of an end of said sheet is within 7 minutes, and the value obtained by measuring the angular deviation at a position 1 inch to less than 3 inches inside of an end of said sheet is within 14 minutes.

Condition 5: When the thickness of said sheet ranges from 0.500 inch to less than 1.000 inch, the value obtained by measuring the angular deviation at a position 3 inches or more inside of an end of said sheet is within 12 minutes, and the value obtained by measuring the angular deviation at a position 1 inch to less than 3 inches inside of an end of said sheet is within 20 minutes.

Condition 6: When the thickness of said sheet ranges from 1.000 inch to less than 2.500 inches, the value obtained by measuring the angular deviation at a position 3 inches or more inside of an end of said sheet is within 20 minutes, and the value obtained by measuring the angular deviation at a position 1 inch to less than 3 inches inside of an end of said sheet is within 25 minutes.

Condition 7: When the thickness of said sheet ranges from 2.500 inches to 4.000 inches, the value obtained by measuring the angular deviation at a position 3 inches or more inside of an end of said sheet is within 30 minutes, and the value obtained by measuring the angular deviation at a position 1 inch to less than 3 inches inside of an end of said sheet is within 35 minutes.

The plastic sheets of the present invention are transparent, show neither coloring nor sink marks on the surface, have excellent craze resistance and low long-term water absorption percentage, and are hence suitable for use as aircraft windshields. Moreover, such sheets having a heat shrinking percentage which is not greater than the specified value also meet the requirements prescribed for biaxially drawn sheets.

DESCRIPTION OF PREFERRED EMBODIMENTS

As used herein, the term "angular deviation" refers to the deviation measured between a cross mark on a screen and the projected cross mark according to the method of ASTM D637.

The term "degree of swelling" refers to a value obtained by vacuum-drying a 20 mm×20 mm×6 mm specimen at 70° C. for 96±2 hours, soaking it in acetone at 35±1° C. for 96±2 hours, and then making a calculation according to the following equation.

(Degree of swelling)=(Weight after soaking)/(Weight before soaking)

As to the monomer composition used in the present invention to obtain a plastic sheet, if the amount of methacrylic acid is less than 0.1 part by weight or the amount of glycidyl methacrylate is less than 0.1 part by weight per 100 parts by weight of methyl methacrylate, the resulting plastic sheet will not meet the requirement for craze resistance. On the other hand, if the amount of methacrylic acid is greater than 2.0 parts by weight or the amount of glycidyl methacrylate is greater than 1.5 parts by weight, it will be difficult to meet the requirement for long-term water absorption percentage which is an important standard for aircraft windshields. Moreover, it will be difficult to separate the resulting plastic sheet from the glass plate used as a mold in cast polymerization.

If the amount of methacrylic acid is in the range of 0.5 to 2.0 parts by weight and the amount of glycidyl methacrylate is in the range of 0.5 to 1.5 parts by weight, the resulting plastic sheet will have particularly good craze resistance. If the amount of methacrylic acid is in the range of 0.1 to 0.5 part by weight and the amount of glycidyl methacrylate is in the range of 0.1 to 0.5 part by weight, the resulting plastic sheet will be particularly excellent in formability.

The plastic sheets of the present invention are made by cast polymerization, and any well-known radical initiator may be used as the polymerization initiator therefor.

Specific examples of the radical initiator include azo initiators such as 2,2'-azobisisobutyronitrile, 2,2'-(2,4-dimethylisovaleronitrile), 2,2'-azobis(4-methoxy-2,4-dimethylvaleronitrile) and 1,1'-azobis(cyclohexane-1-carbonitrile); and peroxide initiators such as lauroyl peroxide, methyl ethyl ketone peroxide, diisopropyl peroxydicarbonate and dicyclohexyl peroxydicarbonate.

Moreover, if necessary, various well-known additives such as ultraviolet absorbers, antioxidants and mold release agents may suitably be used in the present invention by incorporating them uniformly into the monomer composition.

No particular limitation is placed on the type of the mold used for cast polymerization, but any of well-known molds such as glass molds and metallic molds may be used.

The above-described monomer composition may be polymerized, for example, under the following conditions.

At the initial stage of the polymerization reaction, the monomer composition is polymerized in a water bath at a temperature in the range of 20 to 80° C. and preferably 30 to 65° C. During polymerization in the water bath, it is desirable that the difference ($\Delta T$) between the water temperature and the internal temperature of the polymerization mixture be not greater than 3° C., preferably not greater than 2° C., for sheet thicknesses of less than 0.25 inch; not greater than 10° C., preferably not greater than 7° C., for sheet thicknesses of 0.25 inch to less than 1 inch; and not greater than 15° C., preferably not greater than 10° C., for sheet thicknesses of 1 inch to less than 3 inches. If $\Delta T$ is greater than the afore-said value, a considerable distortion may be produced during polymerization in the water bath, so that the angular deviation will tend to exceed the specified value. When an object is seen through a sheet having a great angular deviation, the object looks distorted and, therefore, the sheet is not suitable for use as an aircraft windshield.

Subsequently to the above-described polymerization, the polymerization mixture is desirably postpolymerized in an air bath at a temperature in the range of 110 to 140° C. and preferably 120to 135° C. If the temperature is lower than this range, a longer time will be required to reduce the amount of residual monomers. On the other hand, if the temperature is higher than this range, the amount of residual monomers will be increased contrariwise.

Then, the resulting sheet is heat-treated in an air oven at a temperature in the range of 150 to 200° C. and preferably 170 to 190° C. If the heat-treating temperature is lower than this range, a longer heat-treating time will be required to reduce the degree of swelling of the resulting sheet to 2.20 or less. On the other hand, if the heat-treating temperature is higher than this range, the amount of residual monomers will be increased.

Thereafter, the sheet is cooled to room temperature at a sufficient cooling rate so that it will not be warped. The sheet thus obtained shows neither coloring nor sink marks, has excellent craze resistance and low long-term water absorption percentage, and is hence suitable for use as an aircraft windshield.

The craze resistance of a sheet is strongly affected by the state of its surface. It is frequently the case that the craze resistance of a sheet is reduced when contaminants are present on its surface. For this reason, it is preferable that surface contaminants having a size of not less than 5 $\mu$m be present at a density of 15 pieces or less, more preferably 5 pieces or less, per square millimeter. The size of a surface contaminant expressed by the diameter thereof for a round shaped contaminant and the largest dimension thereof for an irregular shaped contaminant.

The plastic sheet having such few surface contaminants has excellent craze resistance and is hence suitable for use as an aircraft windshield.

The sheet of the present invention may also be used as a biaxially drawn sheet. As important properties of a drawn sheet, the heat shrinking percentage and crack propagation resistance of the sheet are prescribed in MIL-P-25690B. In order to meet the standard for crack propagation resistance, the degree of swelling of the sheet should preferably be not less than 1.90.

For drawing purposes, the sheet is heated to a temperature which permits it to be drawn, and subjected to biaxial drawing at a draw ratio of 60 to 80%, preferably 65 to 75%, for each axial direction. If the draw ratio is less than 60%, the sheet will not be sufficiently drawn, while if it is greater than 80%, the sheet will be excessively drawn. In either case, it is difficult to achieve a value of not less than 2,700 lb/in$^{3/2}$ which is required by the standard for crack propagation resistance.

In order to meet the standard for heat shrinking percentage, it is preferable to reduce the amount of methyl methacrylate remaining in the drawn sheet to not greater than 1.2% by weight and, moreover, to draw the sheet at a draw ratio of not less than 60% for each axial direction. If the amount of methyl methacrylate remaining therein is greater than 1.2% by weight, the heat shrinking percentage at an ambient temperature of 110° C. may exceed the specified value of 10%. Moreover, the draw ratio should preferably be not less than 60% in order that the heat shrinking percentage at an ambient temperature of 145° C. may be not less than the specified value of 37.5%.

The drawn sheet thus obtained shows an improvement in crack propagation resistance and heat shrinking percentage.

The present invention is more specifically explained with reference to the following examples.

In the present invention, craze resistance, crack propagation resistance, long-term water absorption percentage and heat shrinking percentage were evaluated according to MIL-P-8184E and MIL-P-25690B.

EXAMPLE 1

To a basic polymerization mixture prepared by adding 0.6 part by weight of methacrylic acid (MAA) and 1.0 part by weight of glycidyl methacrylate (GMA) to 100 parts by weight of methyl methacrylate (MMA), 0.1 part by weight of lauroyl peroxide, 0.02 part by weight of Aerosol OT (a mold release agent manufactured by American Cyanamid Co.), and 0.05 part by weight of dilauryl thiodipropionate were added. The resulting mixture was stirred until it became homogeneous, and poured into a cell consisting of two reinforced glass plates having a vinyl chloride resin tube interposed therebetween. At the initial stage of polymerization, the mixture was polymerized in a water bath at 40° C. ($\Delta T=1.5°$ C.) for 30 hours. Thereafter, the mixture was polymerized in an air bath at 130° C. for 3 hours to obtain a 1,050 mm×1,050 mm sheet having a thickness of 6 mm.

After this sheet was heat-treated at 180° C. for 3 hours and cooled slowly to room temperature over a period of 2 hours, its degree of swelling, craze resistance, long-term water absorption percentage and angular deviation were measured. Moreover, the crack propagation resistance and heat shrinking percentage of the heat-treated sheet were also measured. The results are shown in Table 1.

The meanings of characters shown in Table 1 and the measuring conditions employed are as follows.

[Note 1] Comonomer composition:
This is indicated by the amounts (parts by weight) of MAA and GMA added to 100 parts by weight of methyl methacrylate.

[Note 2] Conditions for the measurement of angular deviation:

a: The angular deviation is measured at a position 3 inches or more inside of an end of the sheet.

b: The angular deviation is measured at a position 1 inch to less than 3 inches inside of an end of the sheet.

[Note 3] Solvent for the measurement of craze resistance:

A: Toluene/isobutyl acetate (in a weight ratio of 1:2)

B: Isopropanol

[Note 4] Conditions for the evaluation of formability:

A disk-shaped sheet having a diameter of 500 mm is cut out, and its peripheral region having a width of 50 mm is fastened with a clamp. Then, the sheet is subjected to free blow forming at a temperature of 140° C. or 150° C. under an internal pressure of 0.6 kg/cm$^2$. Its formability is indicated by the difference between the heights of the two sheets which are formed at a temperature of 140° C. and 150° C., respectively.

[Note 5] Conditions for counting the number of surface contaminants:

Using an optical microscope of 400 magnification, the number of surface contaminants having a size of not less than 5$\mu$ was counted with respect to five spots having an area of 0.07 mm$^2$. The value thus obtained is converted to a value per square millimeter.

EXAMPLES 2 AND 3

Sheets were made under the same conditions as employed in Example 1, except that each of the comonomer compositions shown in Table 1 was used. Various properties of these sheets were evaluated and the results are shown in Table 1.

EXAMPLES 4 TO 6

The sheets obtained in Examples 1 to 3 were biaxially drawn, and tested for crack propagation resistance and heat shrinking percentage. The results are shown in Table 1.

EXAMPLE 7

A sheet having a thickness of 6 mm was made by carrying out polymerization in the same manner as described in Example 1, except that methacrylic acid and glycidyl methacrylate were added in amounts of 0.1 and 0.15 part-by weight, respectively. This sheet was heat-treated at 180° C. for 3 hours and cooled slowly to room temperature over a period of 2 hours.

Then, this sheet was cut to a size of 400 mm×400 mm, and its surface was manually polished for 2 hours by using a piece of flannel soaked in an alumina polishing fluid (0.3 $\mu$m).

Various properties of the sheet so treated were evaluated and the results are shown in Table 1.

In a similar sheet which was not manually polished, surface contaminants having a size of not less than 5 $\mu$m were present at a density of 50 pieces per square millimeter.

EXAMPLE 8

A sheet was made under the same conditions as employed in Example 7, except that the comonomer composition shown in Table 1 was used. Various properties of this sheet were evaluated and the results are shown in Table 1.

In a similar sheet which was not manually polished, surface contaminants having a size of not less than 5 $\mu$m were present at a density of 55 pieces per square millimeter.

Comparative Example 1

A sheet was made in the same manner as described in Example 1, except that the monomer composition shown in Table 1 was used. Various properties of this sheet were evaluated in the same manner as described in Example 1 or 4, and the results are shown in Table 1.

TABLE 1

| | Comonomer Composition [Note 1] | | Degree of Swelling | Angular Deviation [Note 2] | | Craze Resistance [Note 3] (psi) | | Longterm Water absorption Percentage (%) | Crack Propagation Resistance (lb/in$^{3/2}$) | Heat Shrinking Percentage (%) | | Forma- bility [Note 4] (mm) | Surface Conta- minants [Note 5] (number) |
|---|---|---|---|---|---|---|---|---|---|---|---|---|---|
| | Type | Amount Added (parts) | | Condition | (min) | Solvent | DRY WET | | | 110° C. | 145° C. | | |
| Ex. 1 | MAA | 1.0 | 2.01 | a | 2 | A | 2400 1710 | 2.5 | 900 | 0.1 | 1.5 | 5 | 55 |
| | GMA | 0.6 | | b | 4 | B | 2750 2300 | | | | | | |
| Ex. 2 | MAA | 1.1 | 1.96 | a | 2 | A | 2230 1830 | 2.53 | 870 | 0.1 | 1.6 | — | 58 |
| | GMA | 0.7 | | b | 4 | B | 2820 2320 | | | | | | |

TABLE 1-continued

| | Comonomer Composition [Note 1] | | Degree of Swelling | Angular Deviation [Note 2] | | Craze Resistance [Note 3] (psi) | | | Longterm Water absorption Percentage (%) | Crack Propagation Resistance (lb/in$^{3/2}$) | Heat Shrinking Percentage (%) | | Formability [Note 4] (mm) | Surface Contaminants [Note 5] (number) |
|---|---|---|---|---|---|---|---|---|---|---|---|---|---|---|
| | Type | Amount Added (parts) | | Condition | (min) | Solvent | DRY | WET | | | 110° C. | 145° C. | | |
| Ex. 3 | MAA | 2.0 | 1.94 | a | 2 | A | 2430 | 1890 | 2.84 | 820 | 0.1 | 1.6 | — | — |
| | GMA | 0.7 | | b | 4 | B | 2860 | 2390 | | | | | | |
| Ex. 4 | MAA | 1.0 | 2.01 | a | 2 | A | 2400 | 1710 | 2.5 | 2830 | 7.5 | 39.4 | — | — |
| | GMA | 0.6 | | b | 4 | B | 2750 | 2300 | | | | | | |
| Ex. 5 | MAA | 1.1 | 1.96 | a | 2 | A | 2230 | 1830 | 2.53 | 2770 | 7.2 | 39.5 | — | — |
| | GMA | 0.7 | | b | 4 | B | 2820 | 2320 | | | | | | |
| Ex. 6 | MAA | 2.0 | 1.94 | a | 2 | A | 2430 | 1890 | 2.84 | 2730 | 4.9 | 39.4 | — | — |
| | GMA | 0.7 | | b | 4 | B | 2860 | 2390 | | | | | | |
| Ex. 7 | MAA | 0.1 | 2.46 | a | 2 | A | 2100 | 1680 | 2.18 | 3320 | 7.8 | 39.5 | 23 | 3 |
| | GMA | 0.15 | | b | 4 | B | 2550 | 2100 | | | | | | |
| Ex. 8 | MAA | 0.3 | 2.25 | a | 2 | A | 2250 | 1700 | 2.23 | 3180 | 7.5 | 39.4 | 20 | 2 |
| | GMA | 0.5 | | b | 4 | B | 2650 | 2220 | | | | | | |
| Comp. Ex. 1 | MAA | 2.0 | 1.88 | a | 2 | A | 2500 | 2110 | 2.92 | 2420 | 4.5 | 39.2 | — | — |
| | GMA | 1.8 | | b | 4 | B | 2930 | 2420 | | | | | | |

We claim:

1. A transparent plastic sheet obtained by copolymerizing 100 parts by weight of methyl methacrylate with 0.5 to 2.0 parts by weight of methacrylic acid and 0.5 to 1.5 parts by weight of glycidyl methacrylate, and having a thickness of not greater than 4 inches, wherein the angular deviation satisfies any of the following conditions according to the thickness of said sheet and wherein the degree of swelling is not greater than 2.20, Condition 1: When the thickness of said sheet ranges from 0.06 inch to less than 0.22 inch, the value obtained by measuring the angular deviation at a position 1 inch or more inside of an end of said sheet is within 7 minutes, Condition 2: When the thickness of said sheet ranges from 0.22 inch to less than 0.25 inch, the value obtained by measuring the angular deviation at a position 3 inches or more inside of an end of said sheet is within 7 minutes, and the value obtained by measuring the angular deviation at a position 1 inch to less than 3 inches inside of an end of said sheet is within 9 minutes, Condition 3: When the thickness of said sheet ranges from 0.25 inch to less than 0.375 inch, the value obtained by measuring the angular deviation at a position 3 inches or more inside of an end of said sheet is within 7 minutes, and the value obtained by measuring the angular deviation at a position 1 inch to less than 3 inches inside of an end of said sheet is within 12 minutes, Condition 4: When the thickness of said sheet ranges from 0.375 inch to less than 0.500 inch, the value obtained by measuring the angular deviation at a position 3 inches or more inside of an end of said sheet is within 7 minutes, and the value obtained by measuring the angular deviation at a position 1 inch to less than 3 inches inside of an end of said sheet is within 14 minutes, Condition 5: When the thickness of said sheet ranges from 0.500 inch to less than 1.000 inch, the value obtained by measuring the angular deviation at a position 3 inches or more inside of an end of said sheet is within 12 minutes, and the value obtained by measuring the angular deviation at a position 1 inch to less than 3 inches inside of an end of said sheet is within 20 minutes, Condition 6: When the thickness of said sheet ranges from 1.000 inch to less than 2.500 inches, the value obtained by measuring the angular deviation at a position 3 inches or more inside of an end of said sheet is within 20 minutes, and the value obtained by measuring the angular deviation at a position 1 inch to less than 3 inches inside of an end of said sheet is within 25 minutes, Condition 7: When the thickness of said sheet ranges from 2.500 inches to 4.000 inches, the value obtained by measuring the angular deviation at a position 3 inches or more inside of an end of said sheet is within 30 minutes, and the value obtained by measuring the angular deviation at a position 1 inch to less than 3 inches inside of an end of said sheet is within 35 minutes.

2. A transparent plastic sheet as claimed in claim 1 wherein the degree of swelling is in the range of 1.90 to 2.20, the heat shrinking percentage after being held at 110° C. for 24 hours is not greater than 10.0%, and the heat shrinking percentage after being held at 145° C. for 24 hours is not less than 37.5%.

3. A transparent plastic sheet obtained by copolymerizing 100 parts by weight of methyl methacrylate with 0.1 to 0.5 part by weight of methacrylic acid and 0.1 to 0.5 part by weight of glycidyl methacrylate, and having a thickness of not greater than 4 inches, wherein the angular deviation satisfies any of conditions 1 to 7 described in claim 1 according to the thickness of said sheet and wherein the degree of swelling is in the range of 2.20 to 2.50.

4. A transparent plastic sheet as claimed in claim 3 wherein the heat shrinking percentage after being held at 110° C. for 24 hours is not greater than 10.0%, and the heat shrinking percentage after being held at 145° C. for 24 hours is not less than 37.5%.

5. A transparent plastic sheet as claimed in claim 1 or 3 wherein surface contaminants having a size of not less than 5 μm are present at a density of not more than 5 pieces per square millimeter.

* * * * *